Nov. 21, 1950 G. H. DUHNKRACK 2,530,943
INTERCOMMUNICATING TELEPHONE SYSTEM
Filed July 3, 1947
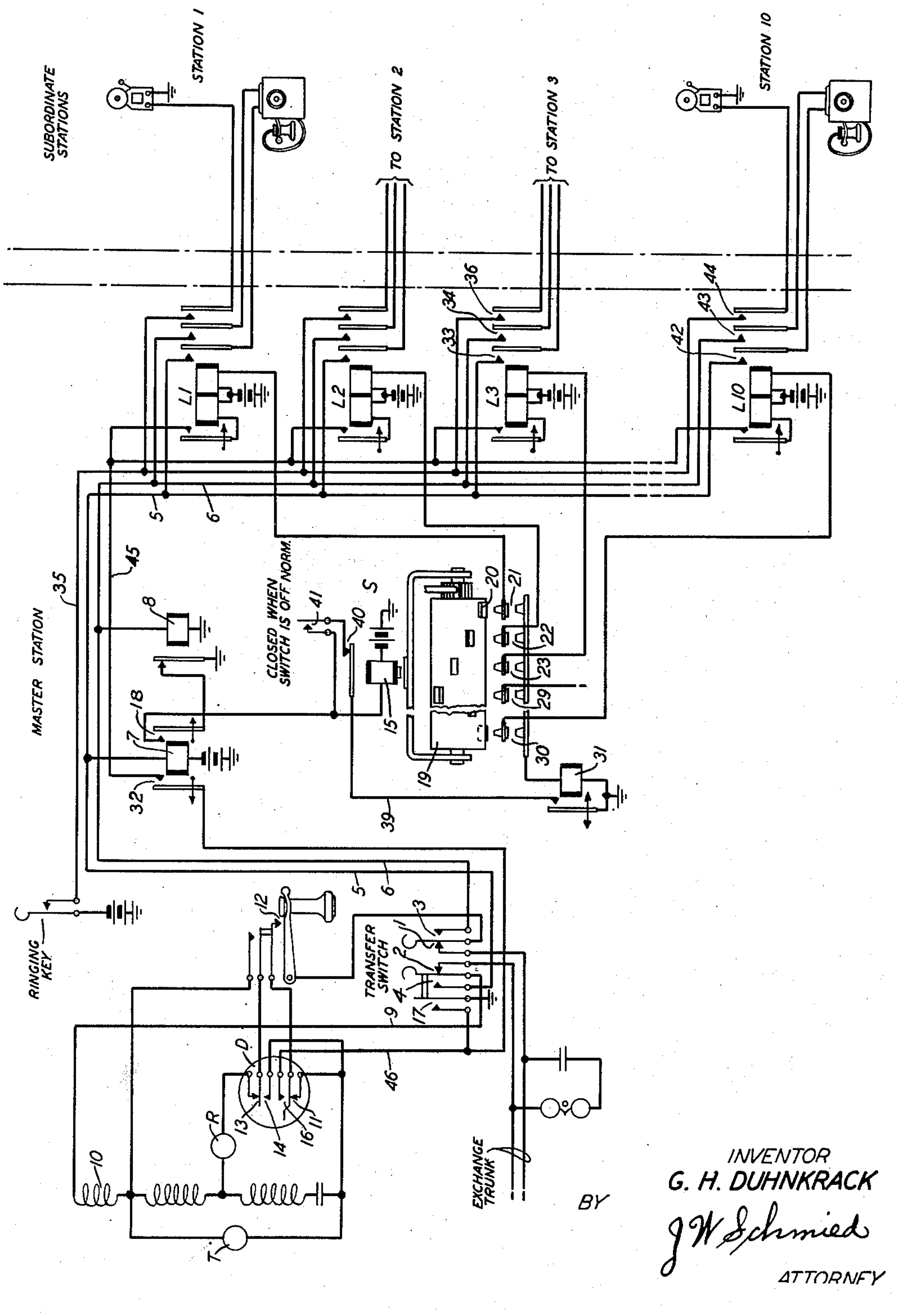
INVENTOR
G. H. DUHNKRACK
BY
J W Schmied
ATTORNEY Patented Nov. 21, 1950

2,530,943

UNITED STATES PATENT OFFICE 2,530,943

INTERCOMMUNICATING TELEPHONE SYSTEM

George H. Duhnkrack, Maplewood, N. J., assignor to Bell Telephone Laboratories, Incorporated, New York, N. Y., a corporation of New York Application July 3, 1947, Serial No. 758,905

5 Claims. (Cl. 179—40)

This invention relates to intercommunicating telephone systems and more particularly to such systems comprising a main or master station and a plurality of subordinate stations arranged and connected in such manner that the master can selectively call and talk with any of the subordinate stations but subordinate stations cannot call each other or the master station.

A feature of the invention resides in a system comprising a main dial station and a plurality of non-dial subordinate stations so arranged that any or all of the subordinate stations can be selectively dialed, one at a time and at will, to connect and lock them in parallel to, and under the control of, the main station to the exclusion of any of the subordinate stations not dialed.

A specific feature resides in a selector switch mechanism which advances step-by-step in response to successive pulses transmitted by the main station dial to effect a locked-in connection between the main station and a predetermined one of the subordinate stations following the last pulse transmitted, and to thereafter restore to normal in readiness to receive another series of pulses and connect another subordinate station.

The invention will be understood from the following description and accompanying drawing which shows a main or master station, comprising a telephone equipped with a modified dial, a selector switch of the type described in Patent 2,339,404 to F. H. Hibbard arranged to restore to normal position following the last pulse of the station code transmitted by the dial, and a plurality of subordinate stations which can be selectively and successively connected and locked to the master station at will under subsequent control thereof as the selector switch is successively operated and restored in response to operation of the dial.

The master station telephone is further adapted and arranged to be connected to and function with an outside telephone system under control of a transfer switch.

The operation of the system follows:

In the arrangement shown, the master telephone is normally connected to an exchange trunk over contacts 1 and 2 of a transfer switch thereby providing the master with exchange service in the usual manner.

If, however, the master desires to call any one of the subordinate stations, station 3, for example, the transfer switch is operated thereby opening its contacts 1 and 2 and closing contacts 3 and 4, thereby connecting the main station to line conductors 5 and 6 extending to battery and ground through line relays 7 and 8.

When the receiver at the master station is removed from the switchhook, relays 7 and 8 both operate, the circuit for which can be traced from battery, relay 7, line conductor 5, contacts 4 of the transfer switch, conductor 9, winding 10 of the induction coil, transmitter T, contacts 11 of the dial D, contacts 12 of the switchhook, contacts 3 of the transfer switch, line conductor 6 and winding of relay 8 to ground.

When the dial is moved off-normal to select the desired station, 3 in the assumed case, off-normal dial contacts 13 are opened and contacts 14 are closed thereby opening the circuit for receiver R and completing a short-circuit around the transmitter T. When the dial is released, impulse contacts 11 are momentarily opened thereby deenergizing relays 7 and 8. Relay 7 is arranged to release slowly and hence remains operated over the successive dial pulses. Relay 8, however, is adapted to operate and release quickly and hence releases immediately during the interval the dial contacts 11 are opened, thereby closing a circuit to operate the magnet 15 of selector switch S, the circuit for which can be traced from ground, contacts of relay 8, contacts 18 of relay 7, and winding of magnet 15 to battery. When the contacts 11 of the dial are opened alternate contacts 16 are closed thus connecting ground to conductor 6, over contacts 12 of the switchhook and contacts 3 of the transfer switch, which is supplied when contacts 17 of the transfer switch are closed. The reason for this ground connection will be later explained.

When magnet 15 is energized the drum 17 of the selector is raised and rotated one step in a manner described in the before-mentioned patent to Hibbard 2,339,404 thereby moving the first lug 20 of the series of lugs, helically positioned on the drum 19, in a position to momentarily close contacts 21. When the dial contacts are closed, magnet 15 releases and restores the drum to its lower or normal position.

When the magnet 15 is again energized responsive to the second pulse, the drum is raised and rotated a second step in position to momentarily close contact 22 when magnet 15 releases and when the dial contacts open to transmit the third pulse, the drum is raised and rotated to its third position in readiness to close contacts 23.

It will be noted that, assuming a normal dial speed of approximately 10 pulses per second, with a break or open interval of approximately .06 second and a closed interval of approximately .04 second, the selector drum 19, during pulsing, will be raised .06 second and lowered for .04 second and therefore during the transmission of the three pulses, which are transmitted the first two pulses cause contacts 21 and 22 to be successively closed for an interval of .04 second each, but following the third or last pulse, contacts 23 remain closed due to the fact that the dial contacts are not interrupted again.

Contacts 21 to 30 are serially connected in a circuit including a common slow-acting relay 31 and individual slow-operating line relays L1 to L10, inclusive, and so constructed and adjusted that the momentary closing of any of the selector contacts 21 to 30 will be ineffective to operate relay 31 and the corresponding L relay.

Due to variations in the speed of operation of the various dials which may be employed at the master station, the relays L1 to L10 may be adjusted to operate after a circuit closure of the order of .1 second and relay 31 after a somewhat longer delay of the order of .15 second.

From the foregoing it will be understood that responsive to the transmission of three pulses of the dial at the master station contacts 21 and 22 of the selector will be closed for intervals which are insufficient to operate relay 31 and either relay L1 or L2 but on the third or last pulse, contacts 23 will be closed and remain closed for an interval longer than the operating time of relay L3 whereupon that relay will operate and by closing its left-hand contacts, completes a holding circuit for itself which can be traced from battery, its left-hand winding and left contacts, contacts 32 of relay 7 and contacts 17 of the transfer key to ground.

Relay L3 is therefore locked in an operated condition under control of the master station and can only be released by the release of relay 7, caused by replacing the receiver on the switchhook, or by operating the transfer key to the alternative trunk position.

Operation of relay L3 closes its contacts 33 and 34 thereby connecting the telephone station 3 to the master station telephone over contacts 33, 34 of relay L3, line conductors 5, 6 and contacts 4, 3 of the transfer switch.

Station 3 can now be signaled, if desired, by operating the ringing key at the master station thereby completing a circuit from battery, contacts of the ringing key, conductor 35, contacts 36 of relay L3 to ground through a signal device at the station. Conversation can now be carried on between the master and station 3 when the station answers.

Relay 31 as before mentioned is constructed to have a slower operating characteristic than any of the L relays and therefore it does not close its contacts until the L relay, with which it is serially connected, has operated and locked. After a time interval sufficient to operate and lock relay L3, relay 31 operates and connects ground over conductor 39, contacts 40 (corresponding to contacts 72 of the mechanism described in Patent 2,339,404 which are closed when the drum is in a released position), off-normal contacts 41 (which correspond to contacts 74 of the same patent disclosure which contacts are closed as soon as the drum is lowered at the end of the first dial pulse, and opened at the beginning of the last or tenth pulse), and winding of magnet 15 to battery whereby a self-interrupting circuit for the switch is established to advance it rapidly through the last or tenth position to normal in readiness for further operation in response to another series of code pulses.

The foregoing describes a selection and connection to the master station of a single subordinate station. Now, with station 3 connected and locked to the master, it may be desirable to add one or more of the remaining subordinate stations to the connection without breaking down the connection to the station 3. For example, let it be assumed that station 10 is to be selected and added which can be accomplished by again actuating the dial at the master station to transmit ten pulses over the conductors 5, 6 to alternately release and operate relay 8 ten times. In accordance with the foregoing description which outlines the operation of the system to select and connect station 3, the selector mechanism will be again actuated to cause contacts 21 to 29 to be momentarily and successively closed and opened and to close contacts 30 for an interval sufficient to operate relay L10 thus connecting the station 10 over contacts 42 and 43 of relay L10 to conductors 5, 6, and to compelte the ringing circuit for station 10 over contacts 44.

A short interval after relay L10 operates, relay 31 again operates as before mentioned, thereby causing magnet 15 to operate once at which time the off-normal contacts of the switch are opened, thereby causing the drum 19 to be lowered to its normal position in readiness for further code pulses if it is later decided to add one or more of the remaining eight stations, as for example, for a so-called conference.

It should be observed at this point that in the case where, following initial connection of a station, for example station 3, if an additional station is to be later added, the operation of relay L3 connects battery through its left-hand contact over locking conductor 45, contacts 32 of relay 7, conductor 46, contacts 16 when the dial pulsing contacts 11 are open, contacts 12 of the switchhook, contacts 3 of the transfer switch, conductor 6 and winding of relay 8 to ground which would hold relay 8 operated and prevent its release when pulsing contacts 11 of the dial were opened. However, this condition in the present arrangement is overcome by connecting ground at contacts 17 of the transfer switch, to conductor 46 thereby short-circuiting relay 8 and causing it to release when the dial contacts 11 are opened and contacts 16 are closed during the following series of code pulses.

It will be understood that in case the master station desires to call a plurality of subordinate stations for a conference the stations can be successively dialed and connected and later signaled simultaneously by a single operation of the ringing key at any time following the dialing of the last code.

What is claimed is:

1. In an intercommunicating telephone system, a master station, a plurality of subordinate stations, a dial at the master station, a selector switch, means responsive to successive impulses transmitted by said dial to advance said switch step by step to successively close its contacts and to stop on the contact closed by the last impulse transmitted, a relay individual to each subordinate station and having a winding connected in an energizing circuit including an individual contact of said selector switch, said relays having a slow-operating characteristic such that the advance of said switch over its contacts preceding the last is ineffective to operate the relays connected to said preceding contacts but so adjusted that the relay whose energizing circuit includes the last closed contact of the switch will operate, a locking path common to all of said relays prepared when the telephone at said master station is taken for use, and means responsive to operation of any one of said relays to complete a holding circuit for itself including said locking path, means responsive to operation of any one of said relays to connect an individual one of said subordinate stations to the telephone at the master station, and delayed action means controlled by the energizing circuit of any of said relays to restore said switch to normal following the operation of said relay.

2. In an intercommunicating telephone system, a master station, a plurality of subordinate stations, a dial at said master station, means comprising a selector switch controlled by said dial for selectively connecting any one of said subordinate stations to the master, means thereupon responsive for holding said connection under control of said master station independent of said selector switch, and other means effective after said holding corporation has been established for restoring said switch to normal whereby other subordinate stations can be successively connected to and held under control of said master station.

3. In an intercommunicating telephone system, a master station, a dial thereat, a plurality of non-dial subordinate stations, and means responsive to actuation of said dial for selectively connecting and locking any of said subordinate stations, one at a time, to and under the exclusive control of said master station and means effective following the connection and locking of a subordinate station to said master station to restore said selective means to normal in readiness for further actuation of said dial to connect and lock another subordinate station to said master station without disconnecting previously connected stations.

4. In an intercommunicating telephone system, a master station, a plurality of subordinate stations, a code impulse transmitter at the master station, a selector switch adapted to advance step-by-step under the control of said impulse transmitter, delayed action means effective following the last code impulse transmitted for connecting and locking one of said subordinate stations to the master station and other means effective subsequent to interconnection of said master and subordinate station to restore said selector switch to normal in readiness for subsequently transmitted code pulses.

5. In an intercommunicating telephone system, a master station, a dial thereat, a plurality of non-dial subordinate stations, means responsive to actuation of said dial for selectively connecting and locking any number of said subordinate stations, one at a time, to and under the exclusive control of said master station, and means independent of the actuation of said dial for simultaneously ringing each subordinate station which is locked to said master station.

GEORGE H. DUHNKRACK.

REFERENCES CITED

The following references are of record in the file of this patent:

UNITED STATES PATENTS

| Number | Name | Date |
|---|---|---|
| 1,747,219 | Bowne | Feb. 18, 1930 |
| 2,045,682 | Alexanderson | June 30, 1936 |
| 2,064,186 | Voss | Dec. 15, 1936 |

FOREIGN PATENTS

| Number | Country | Date |
|---|---|---|
| 424,534 | Great Britain | Feb. 22, 1935 |